United States Patent Office 2,695,698
Patented Nov. 30, 1954

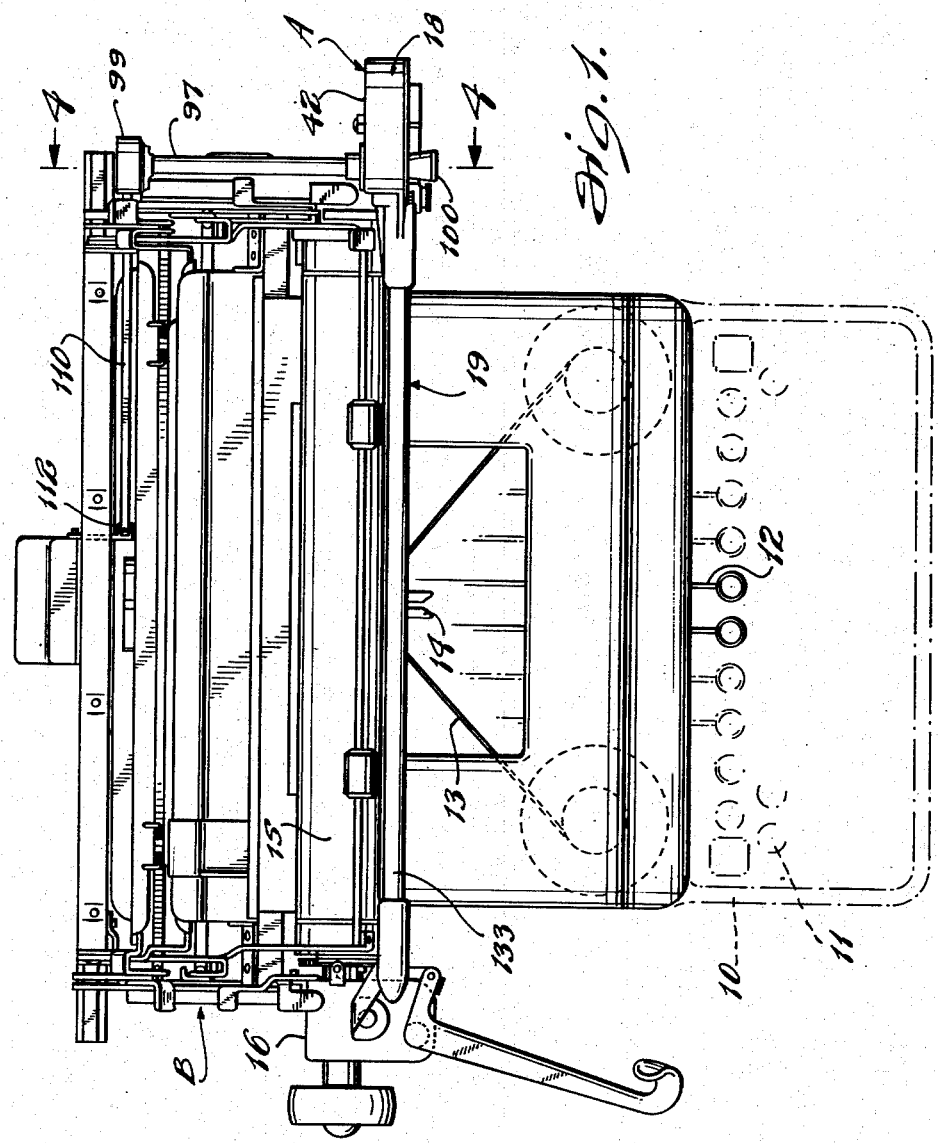

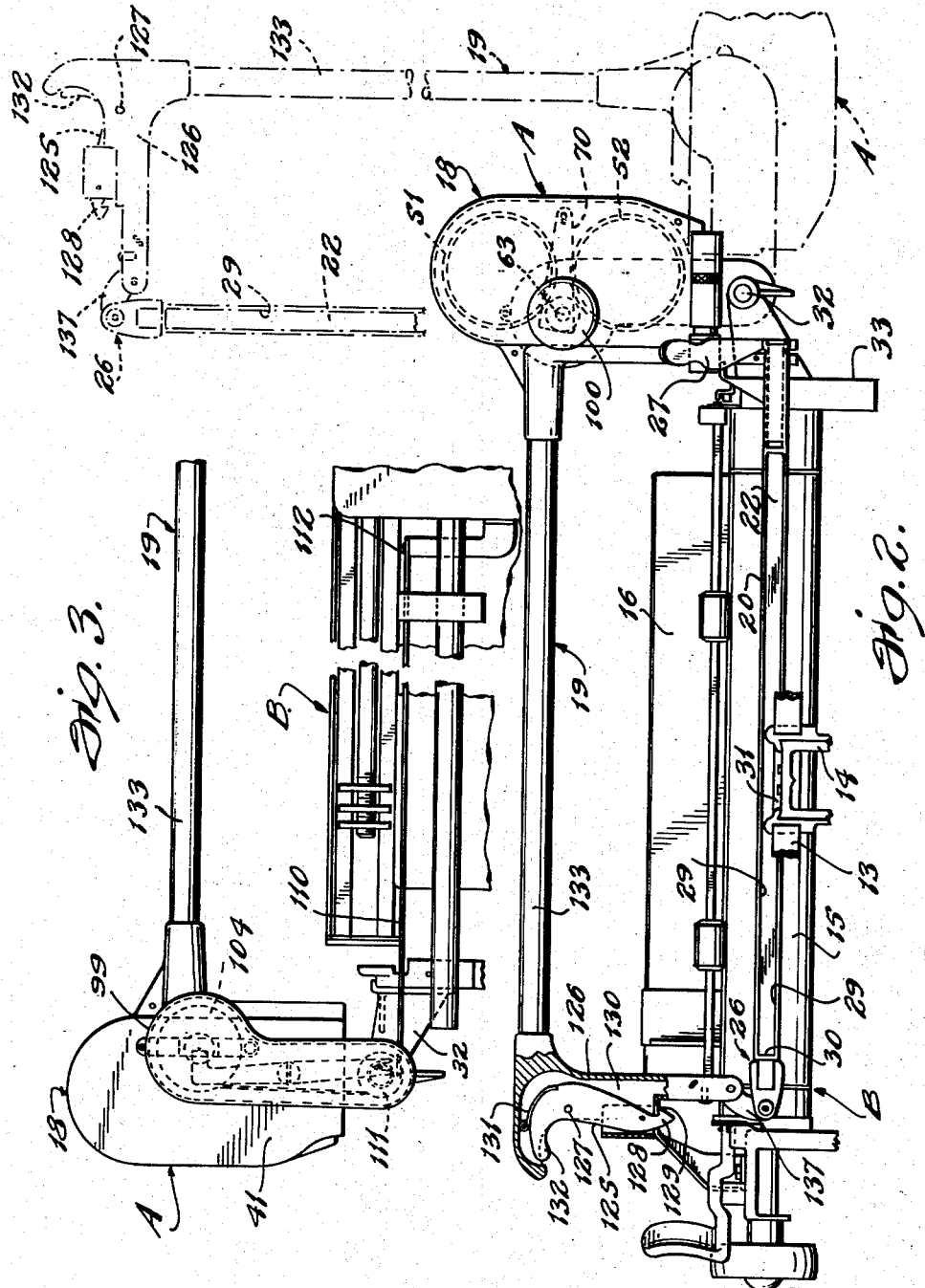

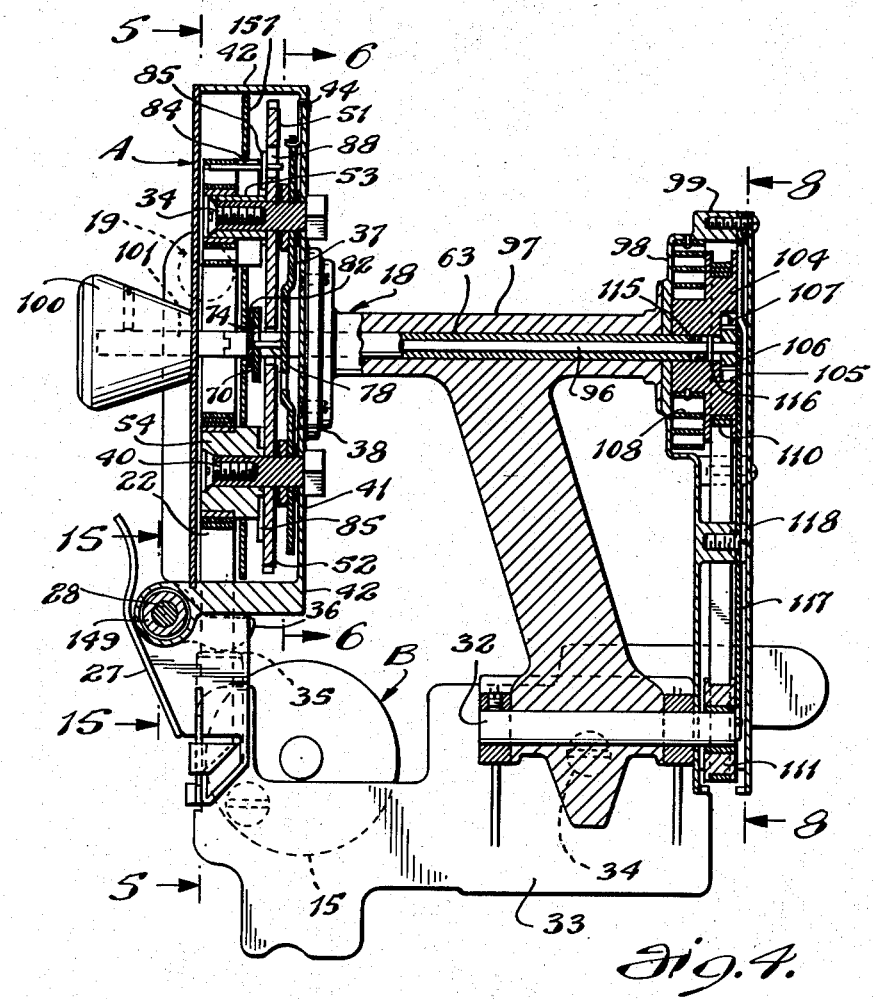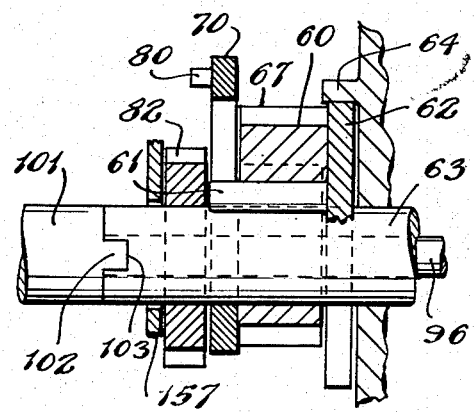

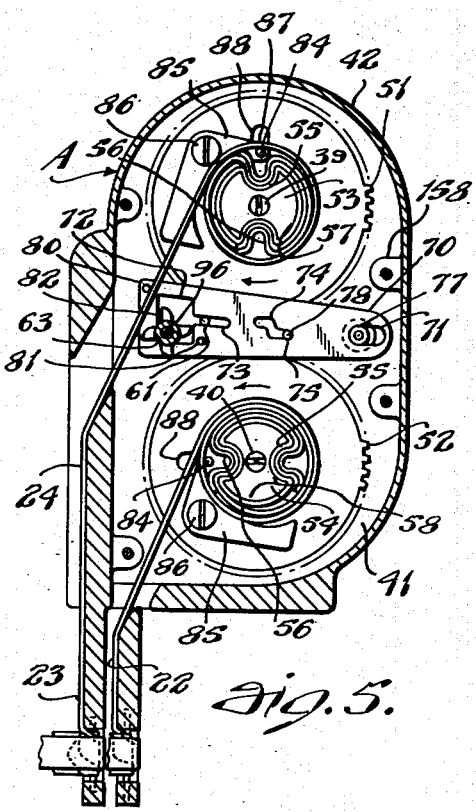

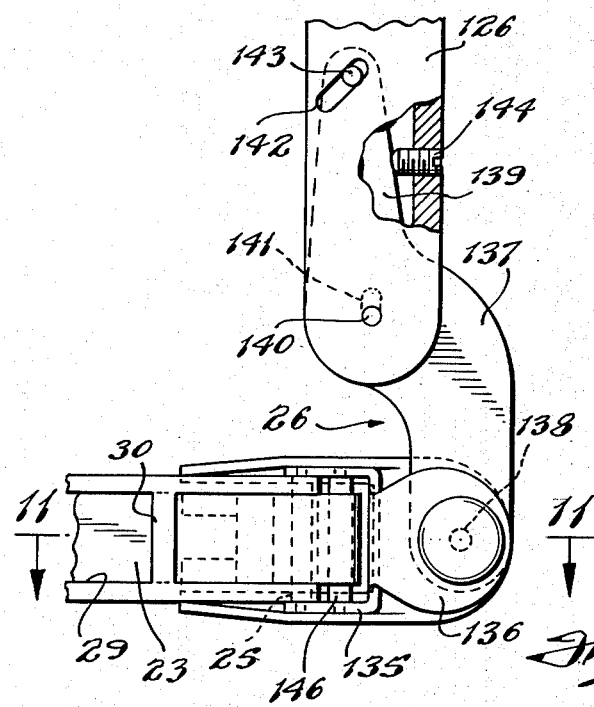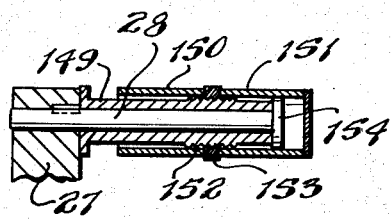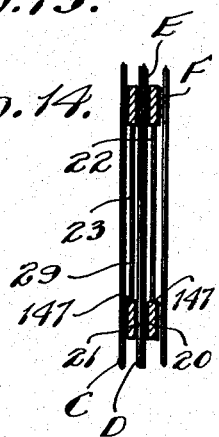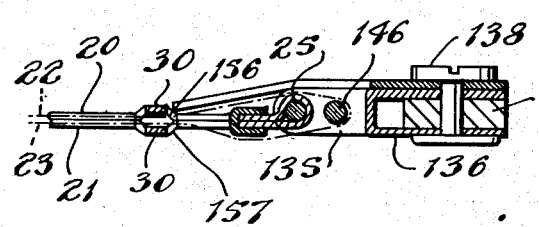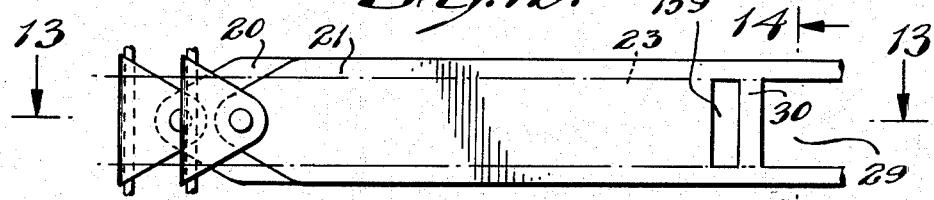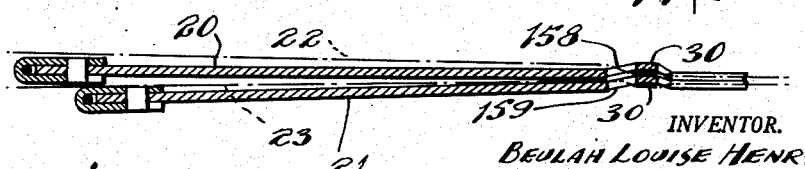

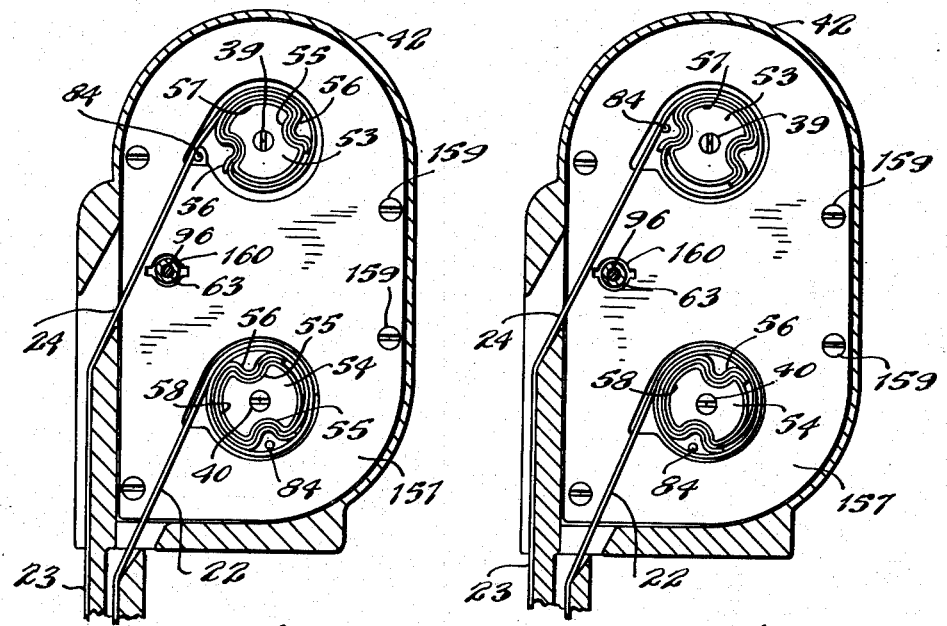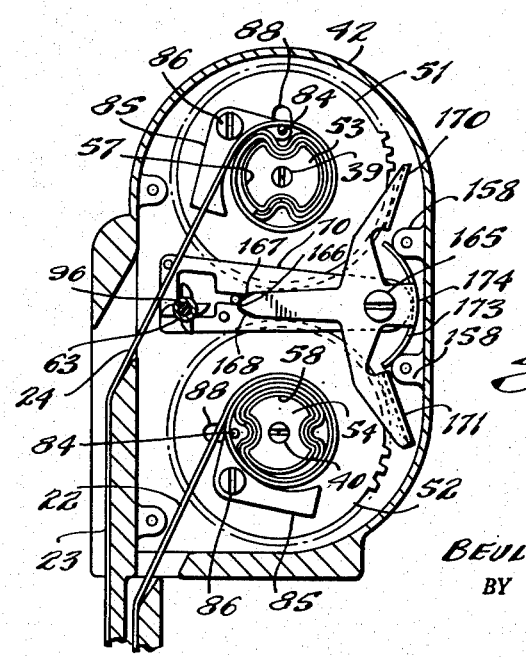

2,695,698

TYPEWRITER ATTACHMENT FOR PRODUCING A PLURALITY OF RIBBON COPIES

Beulah Louise Henry, New York, N. Y.

Application February 11, 1952, Serial No. 271,032

6 Claims. (Cl. 197—153)

This invention relates to typewriter attachments for producing a plurality of ribbon copies simultaneously with the original typed copy, and the invention has particular reference to improved ribbon conducting and reversing means therefor.

In order to produce a plurality of ribbon copies simultaneously with the original typed copy, a plurality of courses of a supplemental ribbon are trained between the paper with a sheet thereof disposed at the front and at the rear of each course. The courses of ribbon thus extending between adjacent sheets of paper have a tendency to move with the paper and to have smudging contact therewith, in addition to sagging of the courses of the ribbon if the proper tautness thereof is not maintained. In order to overcome these objections, the present invention has in view ribbon conducting and reversing means which is constructed and arranged to retain the ribbon at the typing position in front of the platen so as to prevent sagging thereof and movement of the ribbon with the movement of the paper while eliminating the tension or pull on the ribbon in the movement of the reversing means to reverse the direction of movement of the ribbon.

Another object of the invention is to provide parallel ribbon guides for guiding and retaining the courses of the ribbon at the typing position in front of the platen together with means for tightening the guides and for equalizing the tension thereon so that the courses of the ribbon will be maintained a proper distance from the sheets of paper disposed on opposite sides of the guides respectively.

Still another object of the invention is to provide ribbon reversing means in which the same is automatically released by the unwinding of either end thereof from the ribbon spools respectively to permit of the shifting of the reversing means by the movement of the carriage into operative engagement with the other spool for rotating the same.

Still another object of the invention is to provide ribbon reversing means in which the ribbon spools are rotated by means of gearing connected with a drive shaft rotated by the movement of the carriage during the typing operation and which gearing is shifted to free one of the spools and to connect the other of the spools with the drive shaft when the ribbon is unwound from the spools respectively.

With the foregoing and other objects in view, reference is now made to the following specification and accompanying drawings in which the preferred embodiment of the invention is illustrated.

In the drawings:

Fig. 1 is a top plan view of a typewriting machine equipped with an attachment constructed in accordance with the invention.

Fig. 2 is a side view of the upper portion of the typewriting machine with the attachment shown in operative position thereon in full lines, and in an out-of-the-way position in broken lines.

Fig. 3 is a fragmentary rear view of the attachment and carriage of the typewriting machine.

Fig. 4 is an enlarged vertical section taken approximately on line 4—4 of Fig. 1.

Fig. 5 is a vertical sectional view taken approximately on line 5—5 of Fig. 4 with a metal plate removed so as to disclose the underlying parts.

Fig. 6 is a similar view taken approximately on line 6—6 of Fig. 4.

Fig. 7 is a fragmentary view similar to Fig. 5 but with the ribbon spools and parts removed.

Fig. 8 is a vertical sectional view taken approximately on line 8—8 of Fig. 4.

Fig. 9 is an enlarged fragmentary horizontal sectional view taken approximately on line 9—9 of Fig. 6.

Fig. 10 is an enlarged fragmentary view in elevation of one end of the ribbon guide.

Fig. 11 is a horizontal sectional view taken approximately on line 11—11 of Fig. 10.

Fig. 12 is an enlarged fragmentary view in elevation of the other end of the ribbon guide.

Fig. 13 is a horizontal sectional view taken approximately on line 13—13 of Fig. 12.

Fig. 14 is a vertical sectional view taken approximately on line 14—14 of Fig. 13 showing the courses of the ribbon supported in the guides.

Fig. 15 is a vertical sectional view taken approximately on line 15—15 of Fig. 4.

Fig. 16 is a view similar to Fig. 5 with the plate referred to in Fig. 5 in position therein and with the hubs on which the ends of the ribbon are mounted each shown in one of its positions.

Fig. 17 is a similar view with the said metal plate in position and showing the hubs each in another of its positions.

Fig. 18 is a view similar to Fig. 5 and showing a rocking member for providing a braking action to prevent unwinding of the ribbon on the spools when the motion of the ribbon is reversed.

The attachment indicated generally by the reference character A is affixed to a standard typewriter B which includes the usual frame 10 and keys 11 attached to type bars 12 for striking movement of the type bars against the ink ribbon 13. The ribbon 13 is trained through a ribbon carrier 14 and is disposed in front of the platen or roller 15 mounted for rotation on the reciprocatory carriage 16.

The attachment consists of a head 18 having a rectangular frame 19 affixed thereto which includes two parallel guides 20 and 21 for receiving and guiding two leads or courses 22 and 23 of a supplemental ink ribbon 24 slidably mounted in said guides respectively and which guides form the lower longitudinal side of the rectangular frame. The guides are fashioned from a flat metallic strip which is bent about a post 25 with one end of the strip affixed to the head 18 as at 26 and the other affixed to a latch 27 pivoted to the forward face of the head on a pivot pin 28 for swinging movement of the latch to dispose the guides in spaced apart relation for facilitating the insertion of paper therebetween. The guides are formed with rectangular openings 29 extending substantially throughout the length thereof and with cross bands 30 located at the opposite ends thereof under which the leads or courses 22 and 23 of the ribbon extend. The longitudinally extending openings 29 are of a width to receive the type impression therethrough as the type strikes the typewriter ribbon. The arrangement is such that a plurality of sheets of paper trained around the platen or roller will extend upwardly with one sheet disposed in front of each of the guides and one sheet at the rear of each of the guides so as to produce two ink copies on the forward faces of two of the sheets and two ink copies on the rear faces of two of the sheets, in addition to the original copy or type impression produced by the typewriter ribbon.

The rectangular frame 19 together with the head 18 is mounted for swinging movement from an inoperative out-of-the-way position shown in broken lines in Fig. 2 of the drawings to an operative position in which the rectangular frame is disposed longitudinally of the machine and the guides 20 and 21 are arranged between the type guide 31 and the platen or roller 15 as illustrated in Fig. 2 of the drawings. The frame is pivoted for swinging movement on a pivot pin 32 journaled at its ends in a bracket 33 removably secured to the right hand end of the carriage 16 by screws 34 or equivalent fastening means. The bracket 33 is formed with a projection 35 which is adapted to engage a cam arm 36 carried by the latch 27 for camming the latch inwardly so as to dispose and retain the guides 20 and 21 in adjacent relation when the frame 19 is swung into operative position.

The reversing means for automatically reversing the direction of movement of the supplemental ink ribbon 24 is carried by the head 18 and the same includes complementary dogs 37 and 38 which are mounted for swinging movement on stub shafts 39 and 40 secured at their ends to the rear wall 41 of a housing 42 affixed to the right hand end of the frame 19. The dogs 37 and 38 are provided with triangular shaped inner portions 46 and 47 respectively, the inner portion 46 terminating in an arcuate shaped extremity or tooth 48, while the inner portion 47 is formed with an arcuate shaped recess or notch 49 for receiving said tooth or extremity for conjoint arcuate movement of the dogs to opposite sides of a vertical line extending through said stub shafts. The dog 37 is engaged by an over-center spring 44 for tensioning the dogs to retain the same in said positions respectively.

Mounted on the stub shafts 39 and 40 for turning movement thereon are gears 51 and 52 having hubs 53 and 54 provided with oppositely disposed arcuate shaped keyways 55 in which are received the inwardly directed keys 56 of ribbon spools 57 and 58 for securing the said spools on the hubs respectively for movement with the gears. The said gears are adapted to be engaged by a sprocket 60 mounted for turning movement on a pin 61 affixed to an arm 62 which is pivoted for swinging movement on a tubular driving shaft 63 to dispose the sprocket 60 in engagement with either one or the other of said gears. The arm 62 has swinging movement between the stop pins 64 and 65 and is engaged by an over-center spring 66 for tensioning the sprocket 60 into engagement with said gears respectively. The sprocket 60 is rotated by a sprocket 67 which is affixed to the driving shaft 63. The sprocket 67 is rotated in a clockwise direction as viewed from the front of the machine which effects rotation of the sprocket 60 in a counter-clockwise direction and a consequent rotation of the gears 51 and 52 in a clockwise direction when engaged by the sprocket 60. When either one or the other of the gears is not engaged by the sprocket 60, the same rotates freely in a counter-clockwise direction to permit of the unwinding of the supplemental ribbon from the spool mounted thereon with the ribbon being wound on the opposite spool which is rotated in a clockwise direction through said gearing.

In order to effect shifting of the arm 62 to thereby shift the sprocket 60 from out of engagement with one of the gears 51 and 52 and into engagement with the other of said gears, a reciprocatory bar 70 is provided which is formed with a guide slot 71 at one end thereof, a rectangular opening 72 at the opposite end having a narrow slot 73 emanating therefrom and a central opening 74 having a detent slot 75. The said bar is mounted for reciprocatory movement on a stud 77 affixed to the rear wall 41 of the housing 42 which stud protrudes through the guide slot 71. The drive shaft 63 protrudes through the rectangular opening 72 with the outer end of the pivot pin 61 slidably arranged in the slot 73 and a detent pin 78 protruding through the central opening 74 and adapted to engage in the detent slot 75 to retain the sprocket 60 in engagement with the gear 51 against the torque action of said sprocket tending to disengage the same therefrom.

The reciprocatory bar 70 is also provided with two pins 80 and 81 which are adapted to be engaged by the cam teeth of a cam wheel 82 for camming said bar to dispose the sprocket 60 in engagement with either one or the other of the gears 51 and 52. This movement takes place when the dogs 37 and 38 are shifted from one side to the other. In Fig. 5 the bar is shown in its position toward the right with the detent pin 78 engaged in the detent slot 75 and the sprocket 60 in engagement with the gear 51 for rotating the spool 53 to wind the lead 23 thereon and unwind the lead 22 from the opposite spool 54. When the dogs 37 and 38 are shifted from the position shown in Fig. 6 of the drawings toward the left against the stop pins 64 and 65, the detent pin 78 will be moved out of the detent slot 75 whereby the reciprocatory bar will be shifted to the left and the cam wheel 82 which is affixed to the drive shaft 63 will engage the pin 81 so as to swing said bar downwardly and thereby swing the arm 62 downwardly so as to move the sprocket 60 out of engagement with the gear 51 and into engagement with the gear 52. When the dogs 37 and 38 are shifted toward the right, the cam wheel 82 will engage the pin 80 so as to swing the reciprocatory bar to the right and thereby swing the arm 62 upwardly and move the sprocket 60 out of engagement with the gear 52 and into engagement with the gear 51.

In order to swing the dogs 37 and 38 from one side to the other, the gears 51 and 52 are each provided with a detent pin 84 which is affixed to a plate 85 pivoted against the forward face of the gear by a pivot pin 86 to dispose the detent pin 84 in position to engage in an inwardly extending detent 87 formed by one of the keys 56 and which is retained therein by the convolutions of the ribbon on the spool. The detent pin 84 projects rearwardly through a slot 88 in the gear with the rearward end of said pin engaged by a spring 89 for swinging the plate 85 to move the detent pin 84 out of the detent 87 when the ribbon is unwound from the spool. The outward movement of the detent pin 84 disposes the rearward end thereof in position to engage a stop lug 90 on the dog whereby continued rotation of the spool by the pull of the ribbon will cause the dog to be moved therewith. Thus the detent pin 84 carried by the gear 51 will engage the lug 90 on the dog 37 to swing the dogs to the right and the detent pin 84 carried by the gear 52 will engage the lug 90 on the dog 38 to swing the dogs to the left.

A clutch shaft 96 is mounted in the tubular drive shaft 63 for longitudinal reciprocatory movement. The drive shaft 63 is mounted for rotation in the upper frame portion 97 of the head 18 which frame portion 97 is affixed to the rear wall 41 of the housing 42 and to the forward wall 98 of a rear housing 99. The forward end of the clutch shaft 96 protrudes through the drive shaft 63 and has a manipulating knob 100 affixed to the enlarged forward portion 101 thereof. A clutch tooth 102 is formed on the inner end of the enlarged portion 101 and is adapted to engage in a cross-slot 103 at the forward end of the drive shaft 63 for operatively connecting the drive shaft with the clutch shaft 96. The rear end of the clutch shaft 96 extends into the rear housing 99 and through a spool 104 mounted for rotation on the rear end of the drive shaft 63. The spool 104 is formed with a recess 105 in which is arranged a ratchet wheel 106 keyed to the end of the clutch shaft 96. The ratchet wheel 106 is adapted to be engaged by a spring pawl 107 affixed to the periphery of the recess 105 for turning the clutch shaft 96 in a clockwise direction as viewed from the front of the machine with the movement of the spool 104 and to permit of free counterclockwise rotation of the spool. The spool 104 is rotated by a coil spring 108 which spring is affixed at its inner end to the hub of the spool and at its outer end to the inner periphery of the rear housing 99.

In order to effect winding of the coil spring 108 for tensioning the same on the spool 104, a tape 110 is affixed at one end to the spool and is trained about an idler spool 111 mounted for rotation on the protruding end of the pivot pin 32 with the other end of the tape 110 affixed to the frame of the typewriter as at 112. A number of convolutions of the tape 110 are wound on the spool 104 when the typewriter carriage is in a position to the left of the typewriter. When the typewriter carriage is moved to the right, the tape 110 will be played out from the spool 104 so as to rotate the spool on the drive shaft 63 which will effect the winding of the spring 108. It follows therefore that each time the carriage is shifted from left to right, the spring 108 will be rewound and the ratchet wheel 106 will be engaged by the spring pawl 107 to turn the clutch shaft 96 with consequent rotation of the drive shaft 63 and the sprocket wheel 67 to effect winding of the ribbon 24 on one or the other of the ribbon spools.

The clutch shaft 96 is tensioned by a coil spring 115 interposed against the end of the drive shaft 63 and a shoulder 116 formed on said clutch shaft to thereby resiliently maintain the clutch shaft in clutched engagement with the drive shaft 63. In order to disengage the same when the rectangular frame 19 and the head 18 are swung to vertical relation at one side of the typewriter, an angulated bar 117 is pivoted to the housing 99 on a pivot pin 118 with the upper angulated end 119 of said bar arranged in position to engage the protruding rounded end 120 of the clutch shaft 96. The lower end of the angulated bar 117 is formed with a slot 121 which engages an eccentric pin 122 carried by the fixed pivot pin 32. By this construction the upper angulated end 119 of the bar 117 is moved over the outer end 120 of the clutch shaft 96 to cam the same inwardly against the tension of the spring 115 to thereby disengage the clutch tooth 102 from the cross slot 103 and unclutch the drive shaft 63 from the clutch shaft which takes place with the swinging of the frame 19 into vertical relation whereby the typewriter may then be used in the ordinary manner and the ribbon 24 is stationary or has no movement with the movement of the carriage. It will be understood that while the ratchet wheel 106 is keyed to the clutch shaft 96, the clutch shaft has sliding movement with reference thereto to permit of the unclutching of the drive shaft as described.

The attachment is retained in operative position with the ribbon guides 20 and 21 disposed in front of the platen by means of a latch 125 pivoted to an end bar 126 on a pivot pin 127 and having a latch terminal 128 adapted to engage beneath a member 129 affixed to the carriage frame. The latch 125 is mounted in a channel 130 formed in the end bar 126 and a spring 131 normally retains the latch in latched position. The latch is adapted to be released from latched engagement by manually pressing the upper end 132 inwardly against the tension of the spring 131.

The end bar 126 is affixed to the outer end of the top bar 133 and at its lower end the outer ends of the ribbon guides 20 and 21 are adjustably affixed thereto for elevating and lowering the outer ends thereof and for tensioning the same. The ribbon guides 20 and 21 are trained about the post 25 as hereinbefore described which is affixed to the inner end of a yoke 135 having a channeled outer end 136 pivoted to a swinging arm 137 on a pivot pin 138. The arm 137 has its upper end 139 mounted in the channeled lower end of the end bar 126 for pivotal movement on the pivot pin 140. The upper end 139 of the said arm is formed with a vertical slot 141 through which the pivot pin 140 extends and the channeled lower end of the end bar 126 is formed with aligned diagonally disposed cam slots 142 which are engaged by a pin 143 affixed to the upper end 139 of the said arm. An adjustment screw 144 engages through a threaded opening in the inner edge of the end bar 126 and engages at its inner end against the edge of the upwardly extending end 139 of the arm 137 for rocking the arm on the pivot pin 140. It will be understood that tightening the screw 144 will effect outward swinging of the lower end of the arm 137 as well as downward movement thereof due to the camming action of the pin 143 against the sides of the cam slot 142. Thus the ribbon guides 20 and 21 may be tensioned to render the same taut as well as disposing the guides in proper alignment for receiving the type impression against the ribbon as the platen is moved from right to left.

The supplemental ribbon 24 is trained about a vertical post 146 carried by the yoke 135 outwardly of the post 25 with the courses 22 and 23 of the ribbon engaging under the cross bands 30 to dispose the courses of the ribbon centrally of the guides 20 and 21 as illustrated in Figs. 11 and 14. In Fig. 11 the courses 22 and 23 of the ribbon 24 are shown in broken lines for clarity, while in Fig. 14 the bottom edges of the ribbon courses are shown in position upon the lower edges 147 of the rectangular openings 29 which edges form a support for the ribbon and prevent sagging thereof. As shown in Fig. 11 of the drawings, the cross band 30 of the ribbon guide 20 projects forwardly at its outer end while the cross band 30 of the ribbon guide 21 projects rearwardly or towards the platen at its outer end and at their inner ends or adjacent the head 18, the cross bands 30 thereof both project forwardly or away from the platen as shown in Fig. 13 of the drawings. By this construction, the ribbon courses 22 and 23 are trained for movement in the openings 29 in the ribbon guides 20 and 21 and maintained in position centrally of the width of the supporting edge 147 thereof.

At their inner ends the ribbon guides 20 and 21 are fastened respectively to the head 18 as at 26 and to the latch 27 as hereinbefore set forth. The latch 27 is affixed to the inner end of the pin 28 which is mounted for rotation in a sleeve 149 having longitudinal reciprocatory movement in aligned tubular members 150 and 151 carried by the head 18. The sleeve 149 is threaded intermediate its length as at 152 and the same is engaged by a threaded nut 153 located between the tubular members 150 and 151. It will be understood that rotating the nut 153 in one direction will force the sleeve 149 against the latch 27 for moving the same to the left as viewed from the front, while turning the nut 153 in the opposite direction will force the sleeve 149 against the headed outer end 154 of the pin 28 to thereby force the latch 27 toward the right. By this means the ribbon guide 21 may be tightened to equal the tension or tautness of the ribbon guide 20.

The cross bands 30 being located adjacent the ends of the openings 29 in the ribbon guides 20 and 21 provide guide slots 156 and 157 in the ribbon guides 20 and 21 respectively at one end thereof and guide slots 158 and 159 at the opposite end thereof through which the ribbon courses 22 and 23 are directed so as to train the same longitudinally of the openings 29 as illustrated in section in Figs. 11 and 13 of the drawings. This positions the ribbon courses 22 and 23 centrally of the width of the opening 29 as illustrated in Fig. 14 of the drawings so as to permit of movement of the ribbon courses longitudinally of the openings without smudging contact of the sheets of paper fragmentarily shown in Fig. 14 as indicated by the reference characters C, D, E and F.

The hubs 53 and 54 project through openings 155 and 156 in a thin metallic plate 157 with the keyways 55 in said hubs located above the plate. The said plate rests on lugs 158 formed on the housing 42 and is secured in position thereon by screws 159. The upper end of the driving shaft 63 extends freely through an opening 160 in the plate and located directly below the plate and upon the bar 70 is a rocking member 161. The openings 155 and 156 are formed with triangular shaped notches 162 and 163 respectively which permit of the outward movement of the detent pins 84 from the detents 87 when the ribbon is unwound from the spools respectively.

The rocking member 161 is pivoted for rocking movement by the screw 165 engaging through an opening in the rocking plate and into a threaded opening in the stud 77. The rocking member has a slight longitudinal movement on its pivotal connection and is provided with a pointed end 166 with cam edges 167 and 168 on opposite sides of said end which are engaged by the pin 61 to cam the rocking member to positions in which the pointed end 166 is disposed below and above the pin 61. This movement functions to impinge the flanged arms 170 and 171 against the gears 51 and 52 so as to momentarily apply a braking action on said gears to prevent unwinding of the ribbon on the spools 53 and 54 when the motion of the ribbon is reversed. It is to be understood that with the swinging movement of the arm 62 for reversing the direction of movement of the ribbon 24, the pin 61 moves therewith and as the same engages the cam edge 167 of the rocking member 161 the flanged arm 170 will be momentarily tensioned against the gear 51 to effect braking action on the spool 53 to thereby prevent looseness in the lead 23 of the ribbon 24. When the pin 61 is moved in the opposite direction and is cammed against the edge 168 of the rocking member 161, the flanged arm 171 will be momentarily tensioned against the gear 52 to exert a braking action on the spool 54 and prevent slackness in the lead 22 of said ribbon. When the pin 61 is cammed over the pointed end 166 of said rocking member, a bowed spring 173 affixed to the outer free end 174 of the rocking member and tensioned at its ends against the lugs 158 functions to return the rocking member to neutral position with the flanged arms 170 and 171 out of engagement with the gears 51 and 52 respectively.

While the preferred form of the invention has been illustrated and described, the invention is not so limited and is intended to cover all modifications and constructions falling within the purview thereof.

What is claimed is:

1. In a typewriting machine having a reciprocatory carriage and a platen on the carriage, a multicopy attachment including a support pivoted to the reciprocatory carriage of the machine at one end thereof for swinging movement from an operative position in parallel relation with the platen of the carriage to an inoperative position in upright relation at one side of the carriage, a tubular drive shaft mounted for rotation on said support, a gear affixed to said drive shaft, two gears mounted for rotation on said support and each having a ribbon spool on which the ends of an ink ribbon are adapted to be wound and unwound, an intermediate gear carried by said support and arranged to engage said first mentioned gear and either of the latter gears for turning the ribbon spools with the rotation of the drive shaft, means for rotating the drive shaft including a clutch shaft mounted for rotation in said tubular drive shaft with the ends thereof protruding therethrough, clutch means carried by said clutch and drive shafts for clutching said shafts and for operatively connecting the first mentioned gear with the clutch shaft, and a bar pivoted to said support and having swinging movement into camming engagement with the clutch shaft by the movement of the support into upright relation to thereby cam said clutch shaft to disengage said clutch means and unclutch the drive shaft whereby the ribbon spools are inoperative when the support is in upright relation.

2. In a typewriting machine having a reciprocatory carriage and a platen on the carriage, a multicopy attachment including a support pivoted to the reciprocatory carriage of the machine at one end thereof for swinging movement from an operative position in parallel relation with the platen of the carriage to an inoperative position in upright relation at one side of the carriage, a tubular drive shaft mounted for rotation on said support, two rotatably mounted ribbon spools on which the ends of an ink ribbon are adapted to be wound and unwound, means for rotating said ribbon spools including a gear affixed to said drive shaft, means for rotating the drive shaft including a clutch shaft mounted for rotation in said tubular drive shaft and protruding through the ends thereof, clutch means carried by said clutch and drive shafts for clutching said shafts and for operatively connecting said gear to the clutch shaft, means tensioning said clutch shaft to resiliently retain said shaft in clutched engagement, and a bar pivoted to said support and having swinging movement into camming engagement with the clutch shaft by the movement of the support into upright relation to thereby cam said clutch shaft to disengage said clutch means and unclutch the said drive shaft whereby the ribbon spools are inoperative when the support is in upright relation.

3. In a typewriting machine having a reciprocatory carriage and a platen on the carriage, a multicopy attachment including a support pivoted to the reciprocatory carriage of the machine at one end thereof on a pin fixed with reference to the carriage for swinging movement of the support from an operative position in parallel relation with the platen of the carriage to an inoperative position in upright relation therewith, a tubular drive shaft mounted for rotation on said support, two rotatably mounted ribbon spools on which the ends of an ink ribbon are adapted to be wound and unwound, means for rotating said ribbon spools including a gear affixed to said drive shaft, means for rotating the drive shaft including a clutch shaft mounted for rotation in said tubular drive shaft and protruding through the ends thereof, clutch means carried by said clutch and drive shafts for clutching said shafts and for operatively connecting the gear with the clutch shaft, means tensioning said clutch shaft to resiliently retain said clutch and drive shafts in clutched engagement, and a bar pivoted to said support and having an eccentric connection with said pin and an offset end adapted to be moved into camming engagement with the clutch shaft with the swinging movement of the support into upright relation to thereby cam said clutch shaft to disengage said clutch means and unclutch said drive shaft whereby the ribbon spools are inoperative when the support is in upright relation.

4. In a typewriting machine having a reciprocatory carriage and a platen on the carriage, a multicopy attachment including a support pivoted to the reciprocatory carriage of the machine at one end thereof for swinging movement from an operative position in parallel relation with the platen of the carriage to an inoperative position in upright relation, a tubular drive shaft mounted for rotation on said support, two ribbon spools mounted for rotation on said support on which the ends of an ink ribbon are adapted to be wound and unwound, means for rotating said ribbon spools with the movement of said drive shaft, means for rotating the drive shaft including a clutch shaft mounted for rotation in said tubular drive shaft, interengageable means carried by said clutch and drive shafts for clutching said shafts, and a bar pivoted to said support and having swinging movement into camming engagement with the clutch shaft by the movement of the support to upright relation to thereby cam said clutch shaft to disengage said drive shaft whereby the ribbon spools are inoperative when the support is in upright relation.

5. In a typewriting machine having a reciprocatory carriage and a platen on the carriage, a multicopy attachment including a support pivoted to the reciprocatory carriage of the machine on a pin fixed with reference to the carriage for swinging movement of the support from an operative position in parallel relation with the platen of the carriage to an inoperative position in upright relation therewith, a tubular drive shaft mounted for rotation on said support, two ribbon spools mounted for rotation on said support on which the ends of an ink ribbon are adapted to be wound and unwound, means for rotating said ribbon spools with the movement of said drive shaft, means for rotating the drive shaft including a clutch shaft mounted for rotation in said tubular drive shaft, interengageable means carried by the clutch and drive shafts for clutching said shafts, and a bar pivoted to said support and having a pin and slot eccentric connection with said pin and an offset end adapted to be moved into camming engagement with the clutch shaft with the swinging movement of the support into upright relation to thereby cam said clutch shaft to disengage said drive shaft whereby the ribbon spools are inoperative when the support is in upright relation 6. In a typewriting machine having a reciprocatory carriage and a platen on the carriage, a multicopy attachment including a support mounted on the reciprocatory carriage of the machine for movement from an operative position in parallel relation with the platen of the carriage to an inoperative position, a tubular drive shaft mounted for rotation on said support, ribbon spools mounted for rotation on said support on which the ends of an ink ribbon are adapted to be wound and unwound, means for rotating one of said ribbon spools with the movement of said drive shaft, means for rotating the drive shaft including a clutch shaft mounted for rotation in said drive shaft, interengageable means carried by the clutch and drive shafts for clutching said shafts, and means carried by said support for movement into camming engagement with the clutch shaft by movement of the support to the inoperative position to thereby cam said clutch shaft to disengage said drive shaft whereby the ribbon spools are inoperative when the support is in the inoperative position.

References Cited in the file of this patent

UNITED STATES PATENTS

| Number | Name | Date |
|---|---|---|
| 1,198,638 | Kurowski | Sept. 19, 1916 |
| 1,705,945 | Smith | Mar. 19, 1929 |
| 2,058,859 | Fried | Oct. 27, 1936 |
| 2,069,277 | Sacerdote | Feb. 2, 1937 |
| 2,217,180 | Noonan | Oct. 8, 1940 |